(12) United States Patent
Megginson

(10) Patent No.: US 8,301,595 B2
(45) Date of Patent: Oct. 30, 2012

(54) USING AMQP FOR REPLICATION

(75) Inventor: Richard Allen Megginson, Albuquerque, NM (US)

(73) Assignee: Red Hat, Inc., Raleigh, NC (US)

( * ) Notice: Subject to any disclaimer, the term of this patent is extended or adjusted under 35 U.S.C. 154(b) by 192 days.

(21) Appl. No.: 12/814,671

(22) Filed: Jun. 14, 2010

(65) Prior Publication Data

US 2011/0307443 A1  Dec. 15, 2011

(51) Int. Cl.
*G06F 17/30* (2006.01)
(52) U.S. Cl. .................................................. 707/622
(58) Field of Classification Search .................. 707/609, 707/610, 622, 635, 640, 661, 672, 705, 790, 707/802
See application file for complete search history.

(56) References Cited

U.S. PATENT DOCUMENTS

| | | | |
|---|---|---|---|
| 6,247,017 B1 * | 6/2001 | Martin | 1/1 |
| 7,139,973 B1 | 11/2006 | Kirkwood et al. | |
| 7,203,687 B2 * | 4/2007 | Adiba et al. | 1/1 |
| 7,788,224 B2 * | 8/2010 | Fleck et al. | 707/623 |
| 8,037,023 B2 * | 10/2011 | Liu et al. | 707/613 |
| 2010/0088187 A1 | 4/2010 | Courtney et al. | |
| 2011/0125823 A1 | 5/2011 | Macken | |
| 2011/0145320 A1 * | 6/2011 | Megginson | 709/203 |
| 2011/0153563 A1 * | 6/2011 | Fitterer et al. | 707/623 |
| 2011/0161929 A1 | 6/2011 | Keating | |

OTHER PUBLICATIONS

USPTO Office Action for U.S. Appl. No. 12/814,678 mailed Apr. 18, 2012.
Carstoiu et al., "A new grid caching system based on AMQP protocol", 2008, IADIS International Conference WWW/Internet, all pages.

* cited by examiner

*Primary Examiner* — Fred I Ehichioya
*Assistant Examiner* — Michelle Owyang
(74) *Attorney, Agent, or Firm* — Lowenstein Sandler PC

(57) ABSTRACT

A message-based replication system hosted by a first directory server receives update data describing an update to be made to a lightweight directory access protocol (LDAP)-based database that is coupled to the first directory server and determines whether the data is received from an advanced message queuing protocol (AMQP) server. The message-based replication system converts the update data into LDAP data format based on a determination that the update data is received from the AMQP server and updates the database using the LDAP update data. The message-based replication system updates the database using the received update data based on a determination that the update data is not received from the AMQP server, converts the update data into wire level data format, and publishes the wire level update data to the AMQP server to allow a second directory server that subscribes to the AMQP server to obtain data representing the update.

15 Claims, 9 Drawing Sheets

USING AMQP FOR REPLICATION

RELATED APPLICATION

The present application is related to co-filed U.S. patent application Ser. No. 12/814,678 entitled "Servicing Database Operations Using a Messaging Server" which is assigned to the assignee of the present application.

TECHNICAL FIELD

Embodiments of the present invention relate to data replication. Specifically, the embodiments of the present invention relate to a method and system for replicating data using an advanced message queuing protocol (AMQP) server.

BACKGROUND

Many enterprises have implemented a directory service to store and manage enterprise data, such as user data, user account data, group data, etc. The directory service can be hosted by a directory server and can store the enterprise data using a directory for all of the information in a single, network-accessible repository. The directory can be a directory that uses a lightweight directory access protocol (LDAP). The enterprise data in an LDAP-based directory may be replicated among a number of directory servers. Replication is the mechanism that automatically copies directory data from one directory server to another. Replication enables an enterprise to provide a highly available directory service and to distribute the enterprise data geographically. In practical terms, replication can help ensure that the directory is available even if some hardware, software, or network problem prevents directory client applications from accessing a particular directory server.

A directory server that holds a master copy of the information can automatically copy any updates to all replicas in other directory servers. However, replication that requires each directory server to communicate directly with every other directory server in a replication environment can restrict the resources of the directory server, which can negatively affect the performance of the directory server. In addition, a replication environment where each directory server communicates with every other directory server is not easily scalable and can limit the number of directory servers that can be deployed in the replication environment. When the resources of the directory servers that are currently deployed reach a maximum capacity, a system administrator cannot easily scale the replication environment.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for replicating database updates using an advanced message queuing protocol (AMQP) server. A message-based replication system hosted by a first directory server receives update data that indicates an update to be made to a lightweight directory access protocol (LDAP)-based database that is coupled to the first directory server and determines whether the update data is received from an AMQP server. The message-based replication system converts the update data into an LDAP data format based on a determination that the update data is received from the AMQP server and updates the LDAP-based database using the LDAP update data. The message-based replication system updates the LDAP-based database using the received update data based on a determination that the update data is not received from the AMQP server, converts the update data into a wire level data format, and publishes the wire level update data to the AMQP server. The AMQP server allows a second directory server that subscribes to the AMQP server to obtain data representing the update.

Embodiments of the present invention allow a directory server to use an AMQP server to replicate changes made to LDAP-based databases. Using an AMQP server to replicate changes made to LDAP-based databases reduces the burden placed on the resources of a directory server and enhances the scalability of the number of directory servers that can be deployed in a replication environment.

Figure 1:
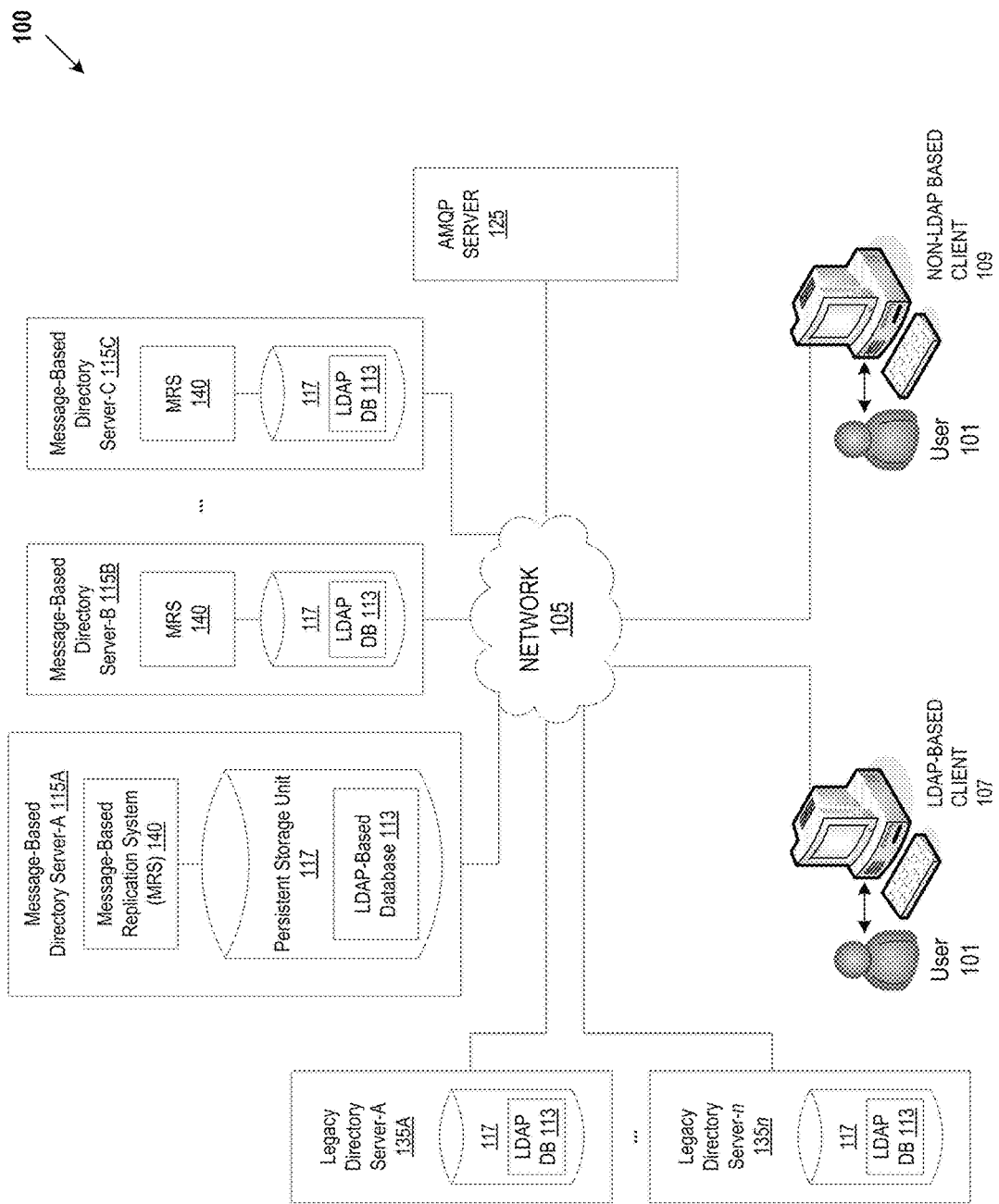
FIG. 1 illustrates an exemplary network architecture in which embodiments of the present invention may operate.

FIG. 1 illustrates an exemplary network architecture 100 in which embodiments of the present invention may operate. The architecture 100 includes one or more directory servers 115, 135 that host a directory service to store data using network 105. A directory server 115, 135 can be any type of computing device including server computers, desktop computers, laptop computers, gateway computers, or similar computing device. The network 105 can be a public network (e.g., Internet) or a private network (e.g., a local area network (LAN)).

The network architecture 100 can include an advanced message queuing protocol (AMQP) server 125 that hosts a publisher/subscriber messaging service. AMQP is an open Internet Protocol for messaging that uses a wire level protocol for messaging. The AMQP server 125 allows publishers to distribute data to AMQP subscribers. An AMQP server 125 can be any type of computing device including server computers, desktop computers, laptop computers, gateway computers, or similar computing device.

A directory server 115, 135 can store enterprise data, such as user data, user account data, group data, etc, in a persistent storage unit 117 using a directory that stores all of the information in a single, network-accessible repository. The repository can be a lightweight directory access protocol (LDAP) based repository, such as an LDAP-based database 113. A database may represent any type of data storage including, for example, relational or hierarchical databases, flat files, application or shared memory, etc. However, it is expressly contemplated that any appropriate directory and directory service can be enhanced for use in accordance with the replication architecture described herein. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set,' as used herein, refers to any positive whole number of items.

A directory server, such as directory server 115, can include a message-based replication system 140 to allow the directory server 115 to publish data to the AMQP server 125 and to subscribe to the AMQP server 125 to obtain data for replicating database changes made to an LDAP-based database 113. A directory server 115 that includes a message-based replication system 140 is hereinafter referred to as a message-based directory server. Using an AMQP server 125 to replicate changes can help minimize the burden placed on the resources of a message-based directory server 115 and can enhance the scalability of the number of directory servers that can be deployed in a replication environment. In one embodiment, the AMQP server 125 resides on a separate machine from a message-based directory server 115. In another embodiment, the AMQP server 125 and a message-based directory server 115 may be hosted by the same machine.

A directory server, such as directory server 135, that does not include a message-based replication system 140 is hereinafter referred to as a legacy directory server. A legacy directory server 135 does not use the AMQP server 125 for replicating updates to an LDAP-based database 113, but rather can maintain replication agreements with other legacy directory servers 135 and as well as with message-based directory servers 115 for replicating changes made to the enterprise data in an LDAP-based database 113.

Users 101 of an LDAP-based client 107 can change the enterprise data that is stored in the LDAP-based databases 113. An LDAP-based client 107 is a client that is compatible with the lightweight directory access protocol. An LDAP-based client 107 can be a smart hand-held device or any type of computing device including desktop computers, laptop computers, mobile communications devices, cell phones, smart phones, hand-held computers or similar computing device capable of transmitting certificate requests and receiving certificates.

For example, the LDAP-based databases 113 may store a telephone number of (555) 555-1234 for Joe Smith and a user 101 can use an LDAP-based client 107 to send update data to request that the message-based directory servers 115 and the legacy directory servers 135 update the user data for Joe Smith in the respective LDAP-based databases 113 with a new telephone number of (555) 555-5678. One of the directory servers 115, 135 may receive the update data request from the LDAP-based client 107 and can process the request to update the telephone number for Joe Smith in the LDAP-based database 113 which it manages.

If the directory server 115, 135 that processes the update request from the LDAP-based client 107 is a message-based directory server 115, it can use the AMQP server 125 to replicate the change to the telephone number of Joe Smith in the other message-based directory servers 115 and can use replication agreements to replicate the change to the legacy directory servers 135. If the directory server 115, 135 that processes the update request from the LDAP-based client 107 is a legacy directory server 135, it can use replication agreements to replicate the change to other legacy directory servers 135 and to message-based directory servers 115 which it has replication agreements with. In turn, a message-based directory server 115 can receive update data from the legacy directory server 135 pertaining to the change to the telephone number of Joe Smith and can use the AMQP server 125 to replicate the change to the other message-based directory servers 115.

The network architecture 100 can include non-LDAP based clients 109. A non-LDAP based client 109 can be a client that is using a protocol that is not compatible with receiving and processing LDAP data. A non-LDAP based client 109 can subscribe to the messaging service hosted by the AMQP server 125 to obtain update data pertaining to the updates made to the LDAP-based databases 117 and to publish requests to update an LDAP-based database. Co-pending Patent Application titled "Servicing Database Operations Using a Messaging Server" describes a method and system for a directory server to obtain an operation request to update an LDAP-based database from a non-LDAP based.

Figure 2:
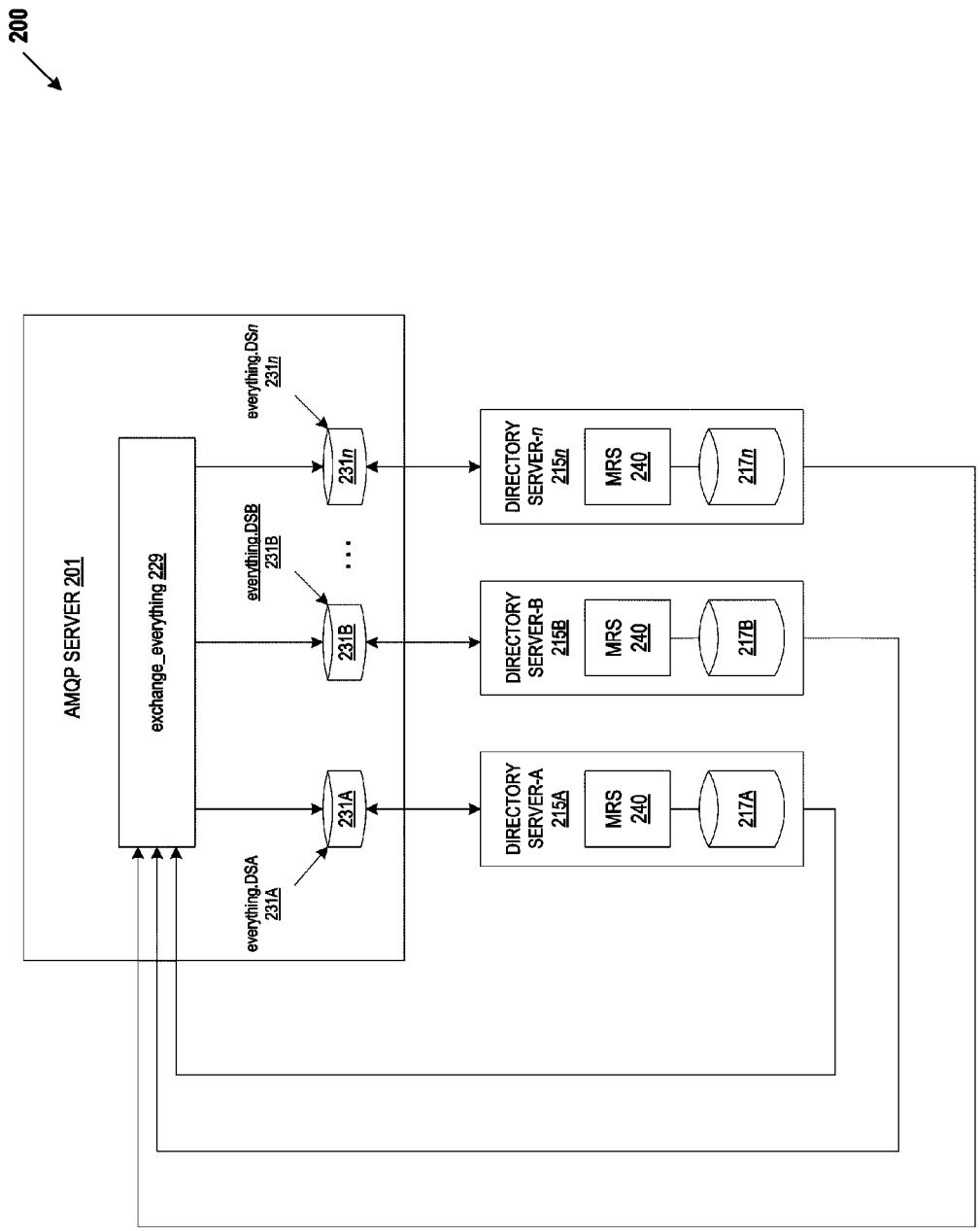
FIG. 2 is a block diagram of one embodiment of a system including an AMQP server for replicating database updates.

FIG. 2 is a block diagram of one embodiment of a system 200 for replicating database updates using an AMQP server 201. The AMQP server 201 hosts a messaging service that allows publishers to publish messages which are distributed to the subscribers of the AMQP server 201. For example, directory servers 215 are publishers that can publish replication messages that describe changes made to LDAP-based databases 217 using the AMQP server 201. Directory servers 215 can also be subscribers that subscribe to the AMQP server 201 to obtain replication messages that allow a directory server 215 to update its own LDAP-based database 217 according to the replication message. Message-based directory servers 215 include a message-based replication system (MRS) 240 for communicating with the AMQP server 201 to replicate changes made to the LDAP-based databases 217, which is described in one embodiment in greater detail below in conjunction with FIG. 3.

The AMQP specification includes components, such as an exchange, a queue, and bindings. An exchange, such as exchange_everything 229, can receive messages from AMQP publishers. An example of a message is a replication message that includes data describing a change made to an LDAP-based database 217. For example, directory servers 215 are publishers to the everything_exchange 229 and can publish replication messages to the everything_exchange 229.

An exchange 229 can have one or more corresponding queues 231 that store messages that are published to the exchange 229. A queue can be assigned to one subscriber. For example, each subscriber of the everything_exchange 229 can have its own queue. For instance, directory server-A 215A has an everything.DSA queue 231A for obtaining replication messages that are published to the everything_exchange 229. Implementation of one subscriber to a queue can help ensure that each message-based directory server 215 in a replication environment obtains a replication message.

An exchange 229 can route a replication message to the queues 231 based on properties of the replication message or the content of the replication message. An exchange 229 can be a 'topic' or 'match' type of exchange for routing messages to queues based on pattern. For example, the exchange_everything 129 can automatically route update data to all of the queues that match the pattern "everything.<server id>" (e.g., everything.DSA, everything.DSB, everything.DSC). Bindings define the relationship between a queue and an exchange and provide the routing criteria. A queue 231 can store a message, such as a replication message, until a subscriber can obtain the message. An AMQP server 201 can deliver (push) a message that is stored in a queue 231 to a subscriber. Alternatively, an AMQP server 201 can send a notification to a subscriber that a message is stored in a queue and a subscriber may receive (pull) a message from the queue 231.

Figure 3:
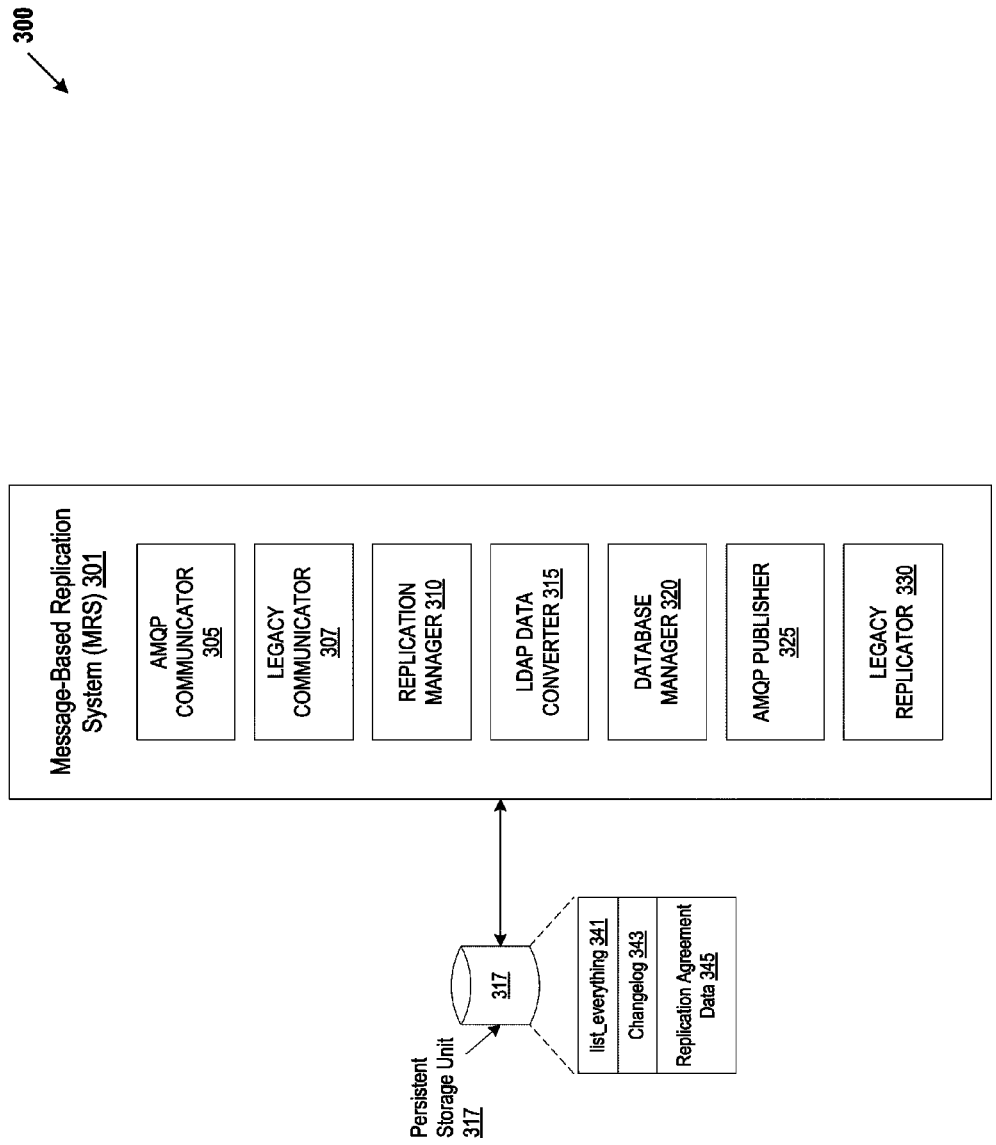
FIG. 3 is a block diagram of one embodiment of a message-based replication system for replicating database updates using an AMQP server.

FIG. 3 is a block diagram of one embodiment of a system 300 for replicating database updates using message-based replication system 301. The message-based replication system 301 includes an AMQP communicator 305, a legacy communicator 307, a replication manager 310, an LDAP data converter 315, a database manager 320, an AMQP publisher 325, and a legacy replicator 330.

The AMQP communicator 305 can configure communication with an AMQP server to publish messages to an exchange on the AMQP server, such as replication messages that describe changes made to an LDAP-based database. The AMQP communicator 305 can configure communication with an AMQP server to subscribe to the AMQP server to obtain replication messages that are published to the exchange by other publishers, such as other message-based directory servers.

The legacy communicator 307 can configure communication with legacy directory servers, which do not use an AMQP server for replication, to exchange replication messages that describe changes made to an LDAP-based database. The legacy communicator 307 can establish and maintain replication agreements with legacy directory servers and can store replication agreement data 345 in a persistent storage unit that is coupled to the message-based replication system 301.

The replication manager 310 can receive update data that describes a change to an LDAP-based database. The update data can be a request from a client, a replication message from a legacy directory server, and a replication message from an AMQP server. The replication manager 310 can determine where the update data is received from by examining the content of the update data and/or the protocol used to obtain the update data. For example, the replication manager 310 can examine an IP address pertaining to the update data to determine whether the update data is from an AMQP server.

The format of the update data can be different depending on whether the update data is received from the AMQP server, or an LDAP-based client and legacy directory server. For example, the update data from an LDAP-based client and a legacy directory server can be in an LDAP data format. The update data from an AMQP server can be in a wire level data format. The LDAP data converter 315 can convert replication messages that are obtained from an AMQP server from the wire level data format into an LDAP data format.

The database manager 320 can update the LDAP-based database according to the update data obtained by the replication manager 310. The database manager 320 can use the data that is in an LDAP data format, such as data received from an LDAP-based client and data received from a legacy server to update an LDAP-based database. The database manager 320 can also use data that the LDAP data converter 315 converts from a wire level data format into an LDAP data format, such as a replication message obtained from an AMQP server, to update an LDAP-based database. The database manager 320 can store data that describes a change made to the LDAP-based database in a changelog 343 in the persistent storage unit 317. The database manager 320 can include an indicator in the data that indicates whether the update data for the change was received from an AMQP server. An indicator that represents that update data was received from an AMQP server allows the message-based replication system 301 to determine that it does not need to republish the change to the AMQP server since the data was already obtained from the AMQP server.

The AMQP publisher 325 can publish update data, such as replication messages, to the AMQP server. The AMQP publisher 325 can associate update data that is received from an LDAP-based client and received from a legacy server with a list, such as list_everything 341. The list 341 can be stored in a persistent storage unit 317 that is coupled to the message-based replication system 301. The list 341 corresponds to an exchange on the AMQP server. The AMQP publisher 325 publishes update data that is received from an LDAP-based client and from a legacy server to an exchange on the AMQP server to allow subscribers that subscribe to the exchange to obtain a replication message that describes the change that was made to an LDAP-based database.

AMQP uses a wire level data format and can receive messages that are in the wire level data format from publishers. The AMQP publisher 325 can convert the update data that is associated with the list_everything from an LDAP data format into the wire level data format and can publish the data that is converted into the wire level data format to the exchange. Examples of wire level data formats can include and are not limited to a Qpid data format, directory services markup language (DSML) format, and LDAP data interchange format (LDIF). Qpid is an open source messaging implementation built on AMQP sponsored by the Apache Software Foundation. DSML is a data format that provides a means for representing directory structural information as an extensible markup language (XML) document. The LDIF data format is a wire level data format used to import and export directory information between LDAP-based directory servers, or to describe a set of changes which are to be applied to a directory. However, it is expressly contemplated that any appropriate wire level data format can be used in accordance with the replication architecture described herein.

The LDAP replicator 330 can exchange replication messages with legacy directory servers for replication changes to LDAP-based databases without using an AMQP server. The LDAP replicator 330 can determine whether a message-based directory server maintains replication agreements with legacy directory servers. The LDAP replicator 330 can examine the replication agreement data 345 in the persistent data unit to determine which legacy servers, if any, it maintains a replication agreement with, and can send update data, such as a replication message in an LDAP data format, to those legacy servers which it has replication agreements with.

Figure 4:
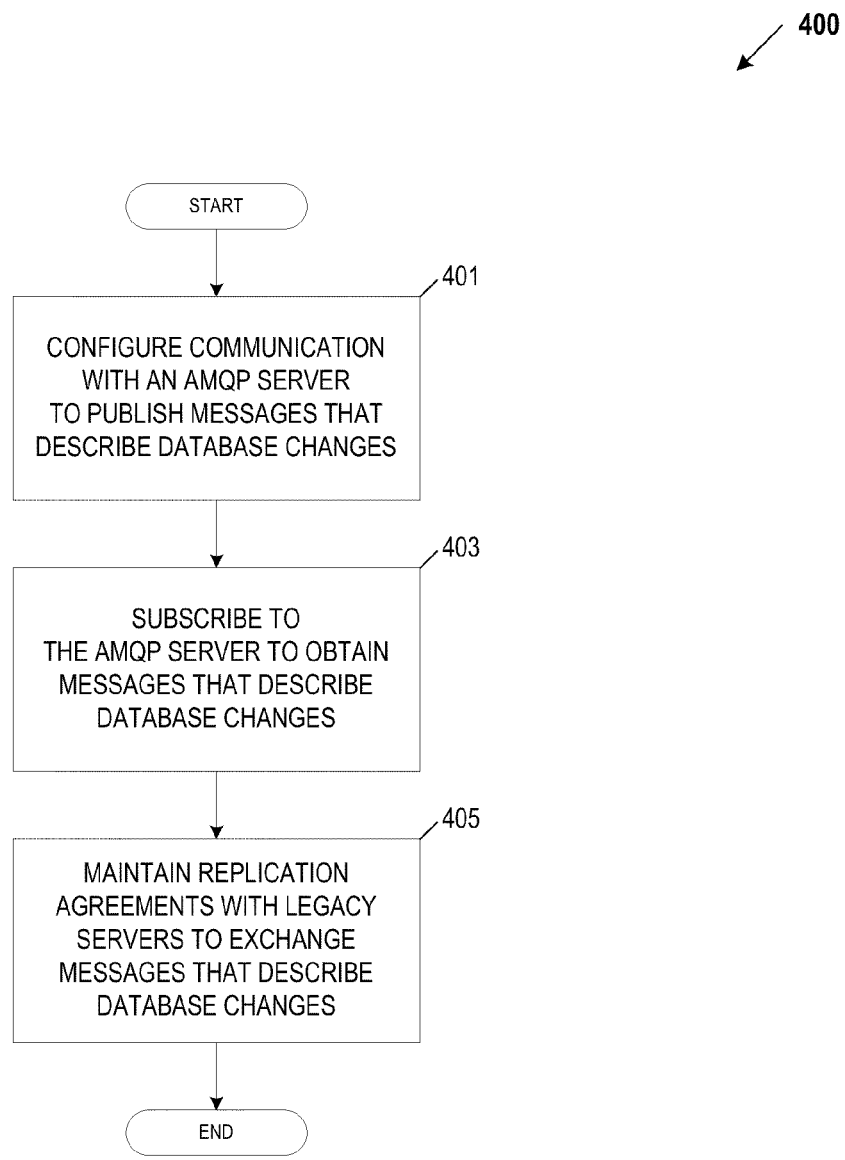
FIG. 4 is a flow diagram of one embodiment of a method for a message-based directory server configuring communication with an AMQP server to replicate a change made to an LDAP-based database.

FIG. 4 is a flow diagram which illustrates an embodiment of a method 400 for a message-based directory server configuring communication with an AMQP server to replicate a change made to an LDAP-based database. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the message-based replication system 140 in a directory server 115 of FIG. 1. In one embodiment, the method 400 starts with a user, such as a system administrator, setting up an exchange (e.g., everything_exchange) on an AMQP server to allow message-based directory servers to publish replication messages to the exchange.

At block 401, the message-based replication system configures communication with an AMQP server to send (publish) update data to an exchange that has one or more corresponding queues. An AMQP server can provide the available exchanges to the message-based replication system. For example, the AMQP server can provide a list that includes the everything_exchange to a system administrator. The message-based replication system can receive user input, such as from the system adminstrator, of the selection of an exchange for the message-based replication system to publish update data to. For example, the message-based replication system can configure communication with AMQP server to publish update data to the exchange_everything.

At block 403, the message-based replication system requests the AMQP server to create a queue that corresponds to the exchange_everything for storing update data to be obtained by the message-based replication system. For example, a user may request that the AMQP messaging system create the queue everything.DSA to allow directory server-A to obtain update data for updates made to LDAP-based databases.

In one embodiment, at block 405, the message-based replication system can further establish a replication agreement with a legacy directory server and can store replication agreement data in a persistent storage unit. A replication agreement allows the message-based replication system to exchange replication messages that describe changes to an LDAP-based database with legacy directory servers without using an AMQP server.

Figure 5:
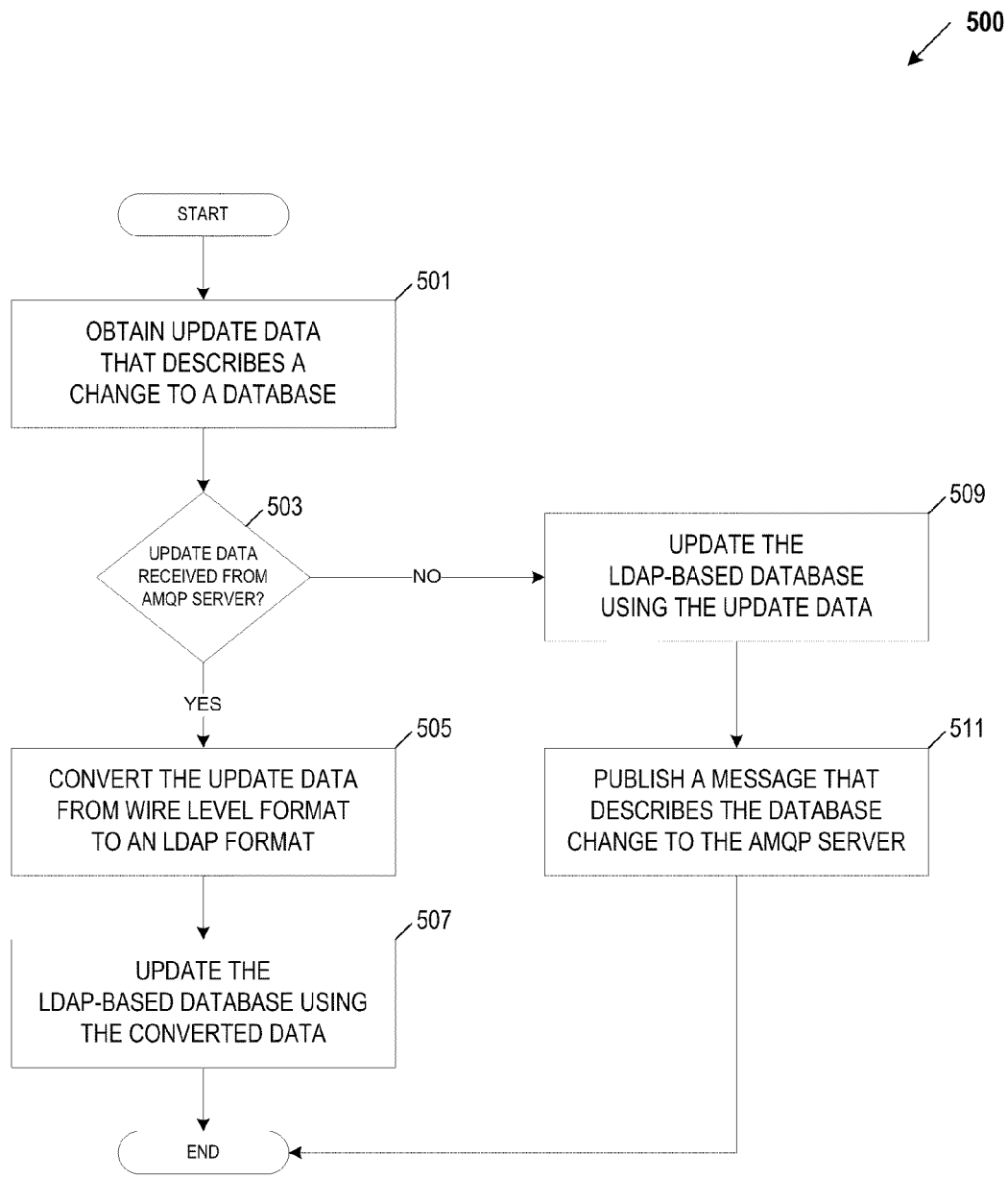
FIG. 5 is a flow diagram of one embodiment of a method for replicating a change to a database using an AMQP server.

FIG. 5 is a flow diagram which illustrates an embodiment of a method 500 for replicating a change to an LDAP-based database using an AMQP server. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the message-based replication system 140 in a directory server 115 of FIG. 1.

In one embodiment, the method 500 starts with the message-based replication system configuring communication with an AMQP server to publish update data to an exchange and to subscribe to the exchange to receive update data that is published by other message-based replication systems. The message-based replication system can also establish replication agreement with legacy directory servers for exchanging replication messages with the legacy directory servers without using an AMQP server.

At block 501, the message-based replication system obtains update data for updates pertaining to an LDAP-based database. Update data can represent a change made or to be made to an LDAP-based database (e.g., name changes, email address changes, and telephone number changes, social security number changes, etc.). The update data can include an entry identifier, a list of object classes for the entry, and data that represents an entire database entry. For example, update data may indicate a change to user data, such as a new telephone number. LDAP databases may store a telephone number of (555) 555-1234 for Joe Smith. Update data can indicate a new telephone number of (555) 555-5678 for Joe Smith.

At block 503, the message-based replication system determines whether the update data is obtained from an AMQP server. A directory server can obtain update data from an AMQP server, a legacy server, and an LDAP-based client. The message-based replication system can examine the content of the update data and/or the protocol used to obtain the update data to determine whether the update data is received from. For example, the message-based replication system can examine an IP address to determine whether the update data is from an AMQP server. If the update data is obtained from an AMQP server (block 503), the update data is in a wire level data format and the message-based replication system converts the update data obtained from the AMQP server into an LDAP data format at block 505. At block 507, the message-based replication system updates the LDAP-based database using the update data that is converted into the LDAP data format.

If the update data is not obtained from an AMQP server (block 503), for example, the update data is received from an LDAP-based client or from a legacy directory server, the update data is already in an LDAP data format. At block 509, the message-based replication system updates the LDAP-based database using the update data that is already in the LDAP data format. At block 511, the message-based replication system publishes update data to the AMQP server to replicate the change indicated by the update data received from the LDAP-based client or the legacy server, which is described in one embodiment in greater detail below in conjunction with FIG. 7.

Figure 6:
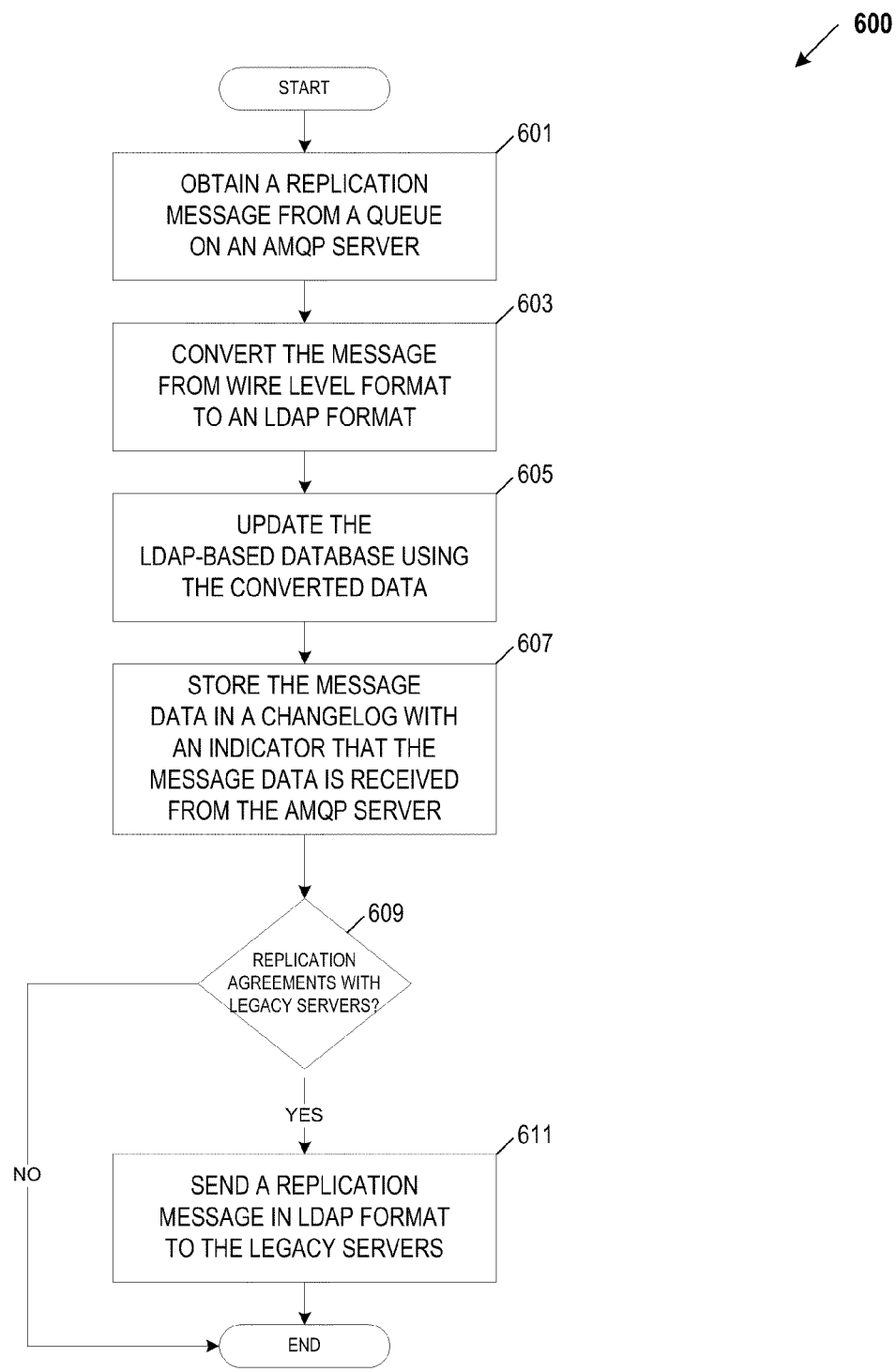
FIG. 6 is a flow diagram of one embodiment of a method for obtaining a replication message from an AMQP server and using the message to replicate a change to an LDAP-based database.

FIG. 6 is a flow diagram which illustrates an embodiment of a method 600 for obtaining a replication message from an AMQP server and using the message to replicate a change to an LDAP-based database. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the message-based replication system 140 in a directory server 115 of FIG. 1.

In one embodiment, the method 600 starts with the message-based replication system subscribing to an exchange hosted by an AMQP server to receive update data, such as replication messages, that is published by other message-based replication systems. The message-based replication system can obtain replication messages that are stored in a queue, which corresponds to the message-based replication system, on the AMQP server.

At block 601, the message-based replication system obtains a replication message from its corresponding queue on the AMQP server. The queue can store a replication message until the message-based replication system can obtain the replication message. The AMQP server can deliver (push) the replication message that is stored in the queue to the message-based replication system. Alternatively, the AMQP server can send a notification to the message-based replication system that a replication message is stored in the queue and the message-based replication system may receive (pull) the replication message from the queue.

Messages that are obtained from the AMQP server are in a wire level data format (e.g., Qpid, DSML, LDIF), and at block 603, the message-based replication system converts the replication message into the LDAP data format. For example, directory server-A may publish a replication message to the everything_exhange that indicates a change to a telephone number to be made in an LDAP-based database. Directory server-B may receive a notification from the AMQP server that a replication message that describes the change to the telephone number is stored in the queue that corresponds to directory server-B. Directory server-B may pull the replication message from the queue and convert the update data in the replication message into an LDAP data format.

At block 605, the message-based replication system updates the LDAP-based database using the data that is converted into the LDAP data format. The converted replication message can include an entry identifier, a list of object classes for the entry, and data that represents an entire database entry. The message-based replication system can identify the entry identifier in the converted update data and search the data in the LDAP-based database for a matching entry identifier. The message-based replication system can replace the entry in the LDAP-based database having the matching identifier with the entry in the converted update data to replicate the change. The update data can include all of the attributes for an entry and the message-based replication system can replace the entire entry in the LDAP-based database. For example, the update data may include the name of Joe Smith, a different telephone number, and an unchanged email address. The message-based replication system can replace the entire entry (e.g., the name, the telephone number, and the email address) in the address book database with the entry in the converted update data even though only the telephone number has changed.

At block 607, the message-based replication system stores data in a changelog that describes the change made to the LDAP-based database, including an indicator that the update data for the change was obtained from the AMQP server. At block 609, the message-based replication system determines whether the message-based directory server maintains replication agreements with legacy servers. The message-based replication system can examine the replication agreement data to determine which legacy servers, if any, it maintains a replication agreement with. If the message-based replication system does not maintain any replication agreements with legacy servers (block 609), the method ends. If the message-based replication system maintains a replication agreement with a legacy directory server (block 609), the message-based replication system sends a replication message in an LDAP data format to the legacy server at block 611.

Figure 7:
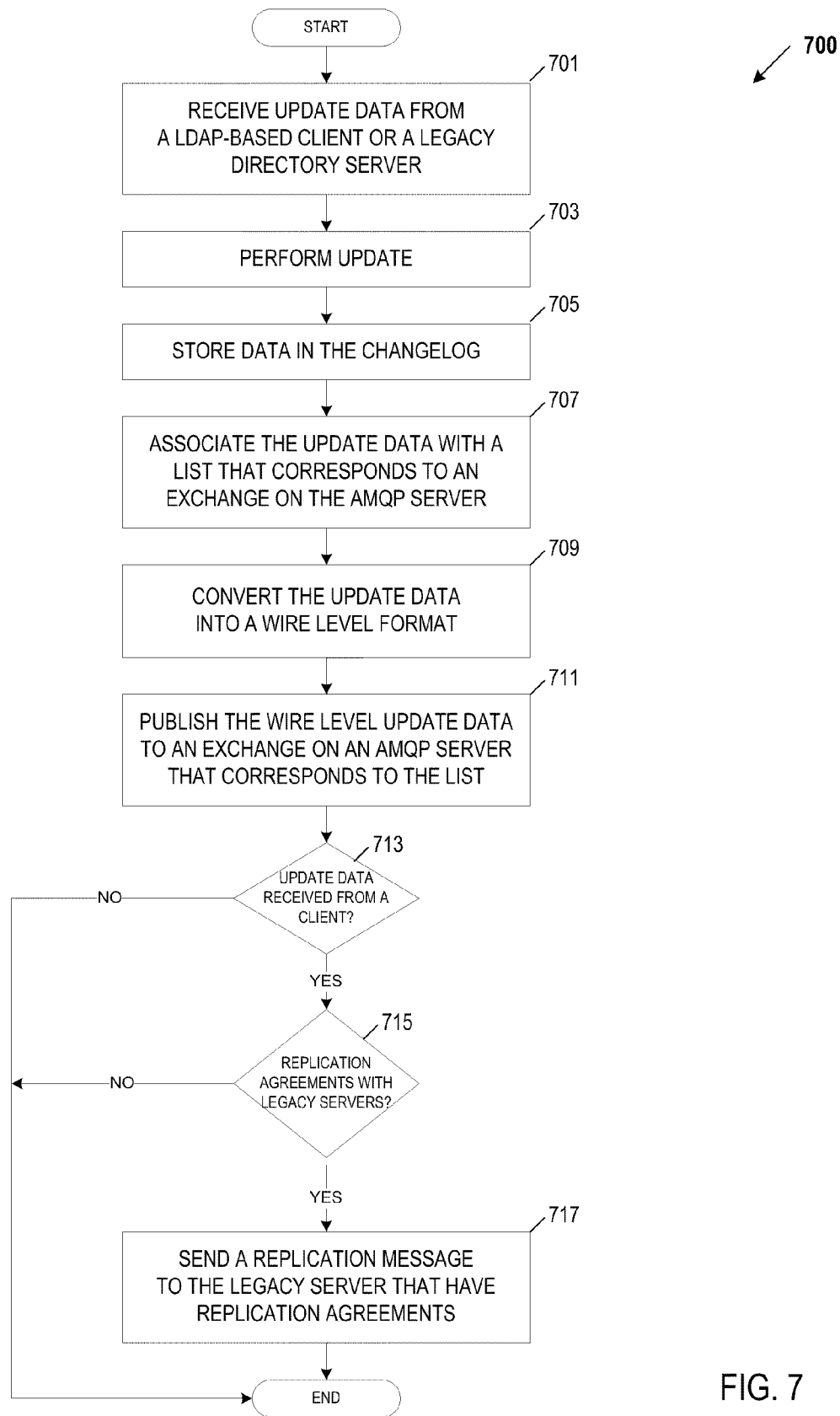
FIG. 7 is a flow diagram of one embodiment of a method for receiving update data from a client and/or a legacy server and replicating the update using an AMQP server.

FIG. 7 is a flow diagram which illustrates an embodiment of a method 700 for receiving update data from a client and/or a legacy server and replicating the update using an AMQP server. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the message-based replication system 140 in a directory server 115 of FIG. 1.

In one embodiment, the method 700 starts with the message-based replication system maintaining replication agreements with legacy directory servers to receive update data from a legacy server, and configuring communication with an AMQP server to publish replication messages to an exchange on the AMQP server.

At block 701, the message-based replication system receives update data that is not from an AMQP server. For example, the message-based replication system can receive update data from an LDAP-based client or from a legacy directory server. The update data that is not from an AMQP server is already in an LDAP data format. At block 703, the message-based replication system updates an LDAP-based database that is coupled to the message-based replication system using the update data that is already in the LDAP data format. The message-based replication system can identify an entry identifier in the update data and search the data in the LDAP-based database for a matching entry identifier. The message-based replication system can replace the entry in the LDAP-based database having the matching identifier with the entry in the update data to replicate the change. At block 705, the message-based replication system stores data in a changelog that describes the change made to the LDAP-based database.

At block 707, the message-based replication system associates the update data that is received from a client or received from a legacy server (at block 701) with a list, such as list_everything. The list corresponds to an exchange on the AMQP server. At block 709, the message-based replication system prepares update data to be published to the exchange to allow subscribers of the exchange to obtain a replication message that describes the change that was made to the LDAP-based database. The message-based replication system converts the update data that is in the LDAP data format into a wire level data format (e.g., Qpid, DSML, LDIF) to allow a replication message to be published on the exchange hosted by the AMQP server. The update data that is converted into a wire level data format can include an entry identifier, a list of object classes for the entry, and data that represents an entire database entry (an entry that includes changed and un-changed attributes). For example, a database entry may include three attributes: a name, a telephone number, and an email address. The message-based replication system can send update data that includes all of the attributes even if only the telephone number attribute has change. For deleted entries, the message-based replication system can send an entry identifier with an empty attribute list to the corresponding exchange.

At block 711, the message-based replication system publishes the replication message that is in the wire level data format on the exchange. Publishing the replication message on the exchange allows other message-based replication systems that subscribe to the exchange to obtain the replication message. These message-based replication systems can update the LDAP-based databases to reflect the change.

At block 713, the message-based replication system determines whether the update data received at block 701 was received from a client. The message-based replication system can determine where the update data is received from by examining the content of the update data and/or the protocol used to obtain the update data. If the update data is not received from a client, the method ends. If the update data is received from a client (block 713), the message-based replication system determines whether the message-based directory server maintains replication agreements with legacy servers at block 715. The message-based replication system can examine the replication agreement data to determine which legacy servers, if any, it maintains a replication agreement with. If the message-based replication system does not maintain any replication agreements with legacy servers (block 715), the method ends. If the message-based replication system maintains a replication agreement with a legacy directory server (block 715), the message-based replication system sends a replication message in an LDAP data format to the legacy server at block 717. A legacy directory server can use the update data to replicate a change in an LDAP-based database, which is manages, without using the AMQP server.

Figure 8:
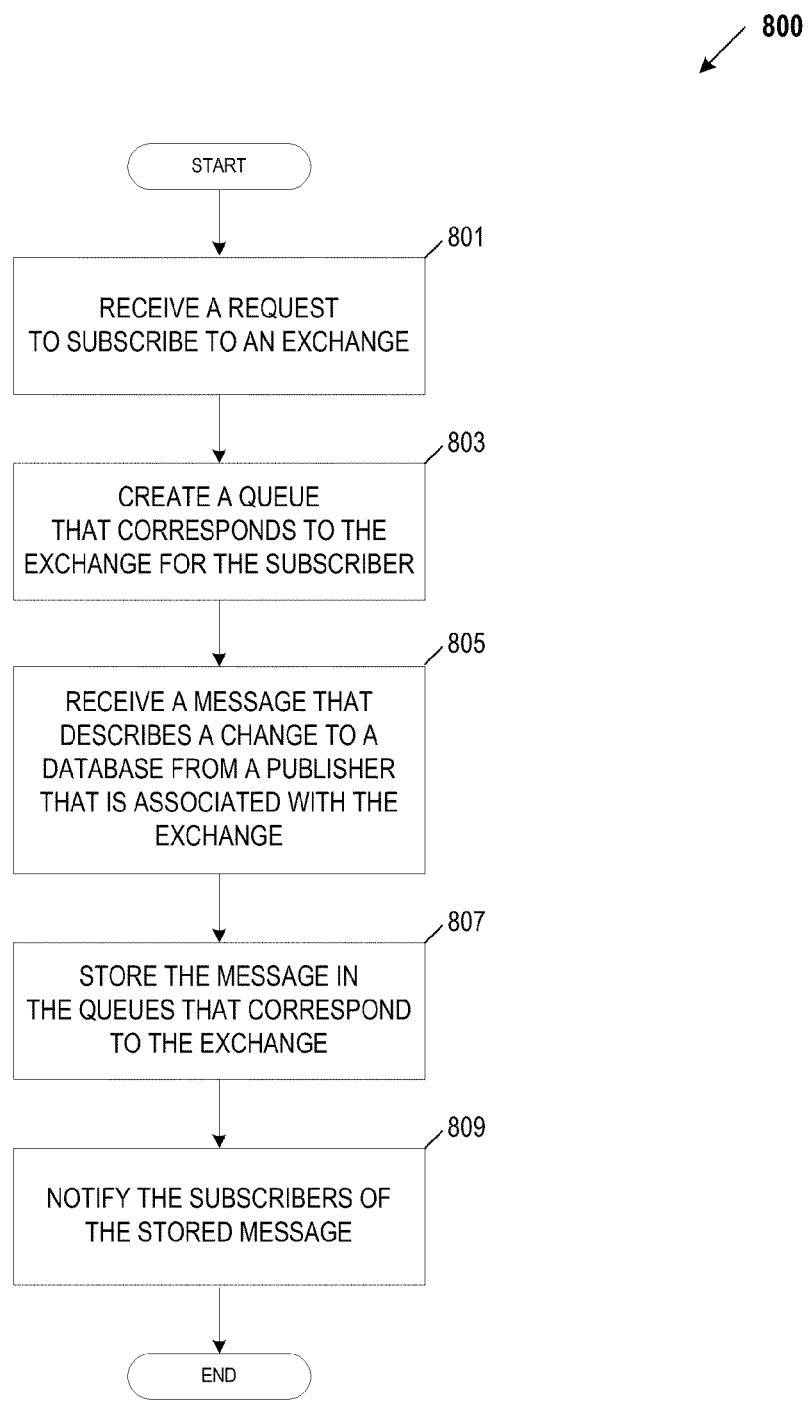
FIG. 8 is a flow diagram of one embodiment of a method for an AMQP server to publish messages for replicating a change made to an LDAP-based database.

FIG. 8 is a flow diagram which illustrates an embodiment of a method 800 for an AMQP server to publish messages for replicating a change made to an LDAP-based database. Method 800 can be performed by processing logic that can comprise hardware (e.g., circuitry, dedicated logic, programmable logic, microcode, etc.), software (e.g., instructions run on a processing device), or a combination thereof. In one embodiment, method 800 is performed by the AMQP server 125 of FIG. 1.

In one embodiment, the method 800 starts with a user, such as a system administrator, setting up an exchange on the AMQP server to allow message-based directory servers to publish replication messages that describe changes made to LDAP-based databases. For example, a user can configure an everything_exchange on the AMQP server and have multiple message-based directory servers as publishers for the everything_exchange.

At block 801, the AMQP server receives a request to subscribe to an exchange, such as the everything_exchange. The request can be from a message-based directory server, such as directory server-A. The everything_exchange may have more than one subscriber. For example, the AMQP server may receive a subscriber request for the everything_exchange from directory server-B and directory server-C.

At block 803, the AMQP server creates a queue for a subscriber. The queue corresponds to the everything_exchange and stores messages that are published to the everything_exchange. The queue can be assigned to a single subscriber. For example, the AMQP server creates an everything.DSA queue for directory server-A, an everything.DSB queue for directory server-B, and an everything.DSC queue for directory server-C.

At block 805, the AMQP server receives a message from a publisher that is to be published on the exchange. The message can be a replication message that describes a change made to an LDAP-based database. For example, the AMQP server receives a replication message from directory server-B that describes a change made to a telephone number in the LDAP-based database that is coupled to directory server-B.

At block 807, the AMQP server stores the replication message in the queues that correspond to the exchange to allow subscribers to obtain the replication message. For example, the AMQP server stores the replication message that describes the changed telephone number in the everything.DSA queue for directory server-A, the everything.DSB queue for directory server-B, and the everything.DSC queue for directory server-C.

In one embodiment, at block 809, the AMQP server notifies the subscribers that subscribe to the exchange that a replication message is stored in a corresponding queue. Subsequently, a subscriber can receive the notification and obtain the replication message from the queue. In another embodiment, the AMQP server sends the replication message that is stored in a queue to the corresponding subscriber.

Figure 9:
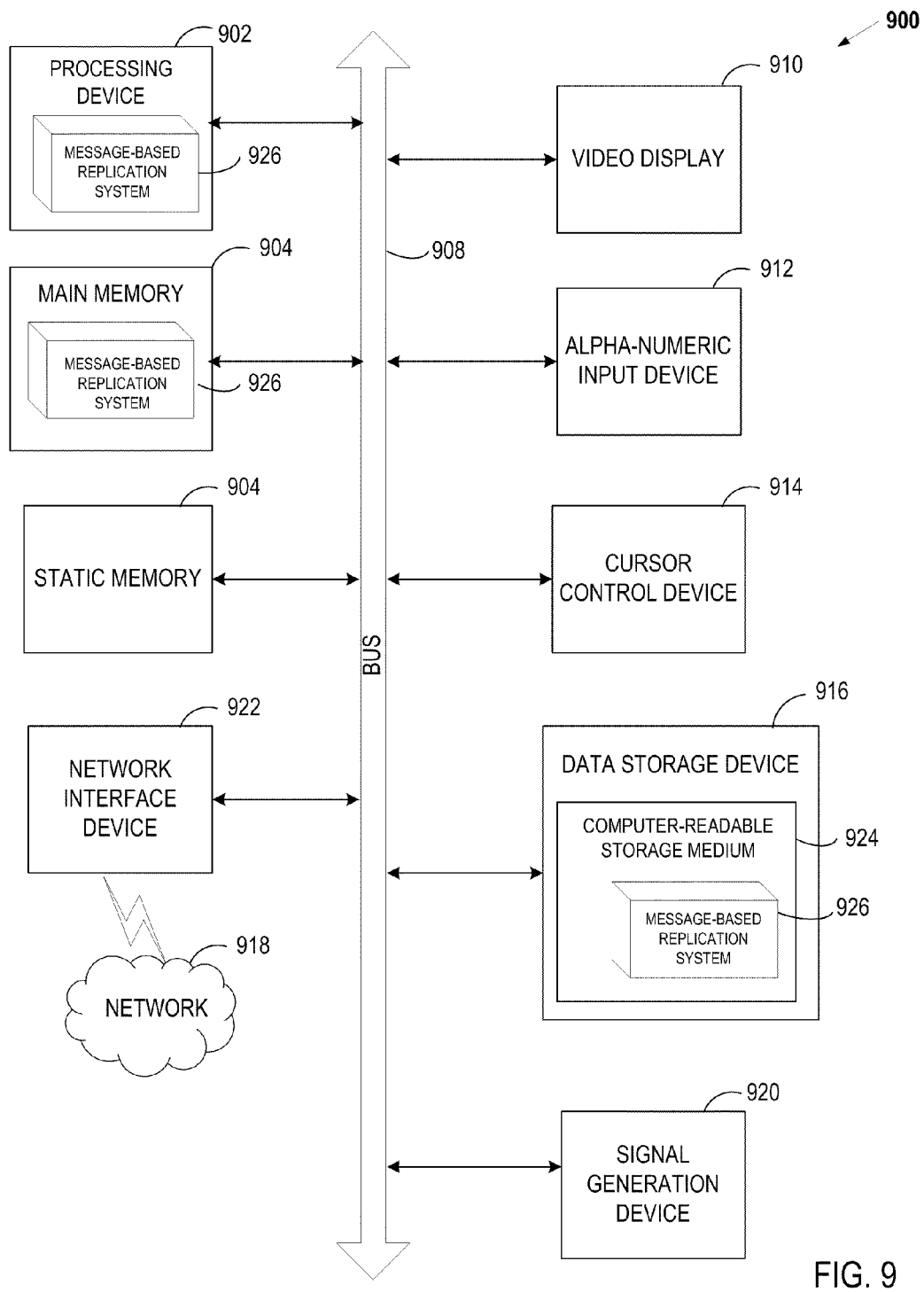
FIG. 9 is a diagram of one embodiment of a computer system for a message-based replication system.

FIG. 9 is a diagram of one embodiment of a computer system for a message-based replication system. Within the computer system 900 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or DRAM (RDRAM), etc.), a static memory 906 (e.g., flash memory, static random access memory (SRAM), etc.), and a secondary memory 916 (e.g., a data storage device in the form of a drive unit, which may include fixed or removable computer-readable storage medium), which communicate with each other via a bus 908.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the message-based replication system 926 for performing the operations and steps discussed herein.

The computer system 900 may further include a network interface device 922. The computer system 900 also may include a video display unit 910 (e.g., a liquid crystal display (LCD) or a cathode ray tube (CRT)) connected to the computer system through a graphics port and graphics chipset, an alphanumeric input device 912 (e.g., a keyboard), a cursor control device 914 (e.g., a mouse), and a signal generation device 920 (e.g., a speaker).

The secondary memory 916 may include a machine-readable storage medium (or more specifically a computer-readable storage medium) 924 on which is stored one or more sets of instructions (e.g., the message-based replication system 926) embodying any one or more of the methodologies or functions described herein. The message-based replication system 926 may also reside, completely or at least partially, within the main memory 904 and/or within the processing device 902 during execution thereof by the computer system 900, the main memory 904 and the processing device 902 also constituting machine-readable storage media. The a message-based replication system 926 may further be transmitted or received over a network 918 via the network interface device 922.

The computer-readable storage medium 924 may also be used to store the message-based replication system 926 persistently. While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The message-based replication system 926, components and other features described herein (for example in relation to FIG. 1) can be implemented as discrete hardware components or integrated in the functionality of hardware components such as ASICS, FPGAs, DSPs or similar devices. In addition, the message-based replication system 926 can be implemented as firmware or functional circuitry within hardware devices. Further, the message-based replication system 926 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "converting", "updating", "publishing", "examining", "associating", "sending", "configuring", "subscribing", "storing", "maintaining," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for replicating database updates using an AMQP server. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method, implemented by a server computing system programmed to perform the following, comprising:
    receiving update data, by the server, the server being a first directory server, the update data indicating an update to be made to a lightweight directory access protocol (LDAP)-based database that is coupled to the first directory server;
    establishing communication with an advanced message queuing protocol (AMQP) server to publish update data and to subscribe to update data that is published by a plurality of directory servers, the update data indicating a change made to LDAP-based databases that are managed by the plurality of directory servers;
    converting, by the first directory server, the update data into an LDAP data format based on a determination that the update data is received from the AMQP server and updating the LDAP-based database using the LDAP formatted update data; and
    updating, by the first directory server, the LDAP-based database using the received update data based on a determination that the update data is not received from the AMQP server, converting the update data into a wire level data format, and publishing the wire level formatted update data to the AMQP server, wherein the AMQP server allows a second directory server that subscribes to the AMQP server to obtain data representing the update.

2. The method of claim 1, wherein the first directory server and second directory server are LDAP-based directory servers.

3. The method of claim 1, wherein determining whether the update data is received from the AMQP server comprises:
    examining an IP address pertaining to the update data.

4. The method of claim 1, wherein converting the update data into the wire level data format comprises converting the update data into at least one of: a Qpid data format, a directory services markup language (DSML) format, and an LDAP data interchange format (LDIF).

5. The method of claim 1, wherein publishing the update data to the AMQP server comprises:
    associating the update data with a list stored on the first directory server; and
    sending the update data that is converted into the wire level data format to an exchange, hosted by the AMQP server, that corresponds to the list.

6. The method of claim 1, further comprising:
    storing the update data with an indicator that the update data is from the AMQP server based on a determination of that the update data is received from the AMQP server.

7. The method of claim 1, further comprising:
    maintaining a replication agreement with a legacy directory server; and sending the update data that is converted into the LDAP data format to the legacy server, based on a determination of that the update data is received from the AMQP server.

8. A system comprising:

One or more processors a persistent storage unit to store a lightweight directory access protocol (LDAP)-based database; and a message-based replication system hosted by a first directory server coupled to the persistent storage unit to receive update data, the update data indicating an update to be made to the LDAP-based database, establish communication with an advanced message queuing protocol (AMQP) server to publish update data and to subscribe to update data that is published by a plurality of directory servers, the update data indicating a change made to LDAP-based databases that are managed by the plurality of directory servers, convert the update data into an LDAP data format and to update the LDAP-based database using the LDAP formatted update data based on a determination that the update data is received from the AMQP server, and update the LDAP-based database using the received update data, convert the update data into a wire level data format, and to publish the wire level formatted update data to the AMQP server based on a determination that the update data is not received from the AMQP server, wherein the AMQP server allows a second directory server that subscribes to the AMQP server to obtain data representing the update.

9. The system of claim 8, wherein the first directory server and the second directory server are LDAP-based directory servers.

10. The system of claim 8, wherein to determine whether the update data is received from the AMQP server comprises the message-based replication system:

to examine an IP address pertaining to the update data.

11. The system of claim 8, wherein to publish the update data to the AMQP exchange comprises:

the persistent storage unit to store a list that is associated with an exchange hosted on the AMQP server, and the message-based replication system to associate the update data with the list and to send the update data that is converted into the wire level data format to the exchange corresponding to the list.

12. The system of claim 8, further comprising:

the persistent storage unit to store a log for managing updates made to the LDAP-based database, and the message-based replication system is further to add the update data to the log with an indicator that the update data is received from the AMQP server based on a determination that the update data is received from the AMQP server.

13. The system of claim 8, further comprising the message-based replication system:

to maintain a replication agreement with a legacy directory server; and to send the update data that is converted into the LDAP data format to the legacy server, based on a determination of that the update data is received from the AMQP server.

14. A non-transitory computer-readable storage medium including instructions that, when executed by a computer system, cause the computer system to perform a set of operations comprising:

receiving update data, by the computing system, the computing system being a first computing system, the update data indicating an update to be made to a lightweight directory access protocol (LDAP)-based database that is coupled to the first computing system;

establishing communication with an advanced message queuing protocol (AMQP) server to publish update data and to subscribe to update data that is published by a plurality of directory servers, the update data indicating a change made to LDAP-based databases that are managed by the plurality of directory servers;

converting, by the first computing system, the update data into an LDAP data format based on a determination that the update data is received from the AMQP server and updating the LDAP-based database using the LDAP formatted update data; and updating, by the first computing system, the LDAP-based database using the received update data based on a determination that the update data is not received from the AMQP server, converting the update data into a wire level data format, and publishing the wire level formatted update data to the AMQP server, wherein the AMQP server allows a second computing system that subscribes to the AMQP server to obtain data representing the update.

15. The non-transitory computer-readable storage medium of claim 14, wherein updating the LDAP-based database comprises:

storing the update data with an indicator that the update data is from the AMQP server based on a determination of that the update data is received from the AMQP server.

* * * * *